United States Patent [19]

Wu

[11] Patent Number: 4,571,680
[45] Date of Patent: Feb. 18, 1986

[54] ELECTRONIC MUSIC PACE-COUNTING SHOE

[76] Inventor: Chyuan-Jong Wu, No. 15, Lane 41, Ta-Tung Rd., Fei-Sha Tsun, Su-Hu Hsiang, Yun-Lin Hsien, Taiwan

[21] Appl. No.: 379,346

[22] Filed: May 18, 1982

Related U.S. Application Data

[63] Continuation-in-part of Ser. No. 267,630, May 27, 1981, Pat. No. 4,401,247.

[51] Int. Cl.⁴ .......... A43B 5/00; G01C 22/00; G10H 1/00
[52] U.S. Cl. .......... 364/410; 364/560; 364/561; 235/105; 84/484
[58] Field of Search .......... 377/15; 364/560, 561, 364/569, 410; 272/96, 99, 70; 235/105; 84/484, 470 R, 465, 1.03; 340/309.4, 232 R, 384 E; 368/3, 10, 12, 245, 251

[56] References Cited

U.S. PATENT DOCUMENTS

| | | |
|---|---|---|
| 258,218 | 5/1882 | Cassidy . |
| 542,107 | 7/1895 | Reinisch et al. .......... 235/105 |
| 621,892 | 3/1899 | Azzimonti . |
| 1,933,243 | 10/1933 | De Merolis et al. . |
| 1,943,222 | 1/1934 | Landi . |
| 2,320,560 | 6/1943 | Braddock . |
| 2,721,420 | 10/1955 | Chatten . |
| 2,931,893 | 4/1960 | Gonzalezarias et al. . |
| 3,008,038 | 11/1961 | Dickens et al. .......... 240/6.4 |
| 3,070,907 | 1/1963 | Rocco .......... 36/8.3 |
| 3,340,846 | 9/1967 | Magiera .......... 116/67 |
| 3,757,466 | 9/1973 | Strelakos .......... 46/175 |
| 3,789,402 | 1/1974 | Heywood et al. .......... 340/384 E |
| 3,791,375 | 2/1974 | Pfeiffer .......... 128/25 |
| 3,878,641 | 4/1975 | Noble .......... 46/175 R |
| 3,898,886 | 8/1975 | Hamm .......... 73/432 |
| 4,019,030 | 4/1977 | Tamiz .......... 235/105 |
| 4,043,241 | 8/1977 | Liu .......... 84/1.01 |
| 4,053,755 | 10/1977 | Sherrill .......... 364/561 |
| 4,121,488 | 10/1978 | Akiyama .......... 84/1.01 |
| 4,175,446 | 11/1979 | Crowninshield et al. .......... 73/787 |
| 4,220,996 | 9/1980 | Searcy .......... 364/561 |
| 4,285,041 | 8/1981 | Smith .......... 364/415 |
| 4,334,190 | 6/1982 | Sochaczevski .......... 340/384 E |
| 4,337,529 | 6/1982 | Mordkawa .......... 368/10 |
| 4,387,437 | 6/1983 | Lowrey et al. .......... 364/410 |
| 4,396,904 | 8/1983 | Hanaoka .......... 340/309.15 |

FOREIGN PATENT DOCUMENTS 2855736 12/1978 Fed. Rep. of Germany .
2912915 10/1979 Fed. Rep. of Germany .

OTHER PUBLICATIONS

Ninth New Collegiate Dictionary, a Merriam-Webster, 1984, p. 138, The Scribner-Bantam English Dictionary, revised edition, Edwin B. Williams, pp. 82 and 83.

Primary Examiner—Errol A. Krass
Assistant Examiner—Heather Herndon
Attorney, Agent, or Firm—Cushman, Darby and Cushman

[57] ABSTRACT

The present invention not only accumulates the number of steps walked, but also sounds delightful music to entertain the walker's body and mind, and further, it can make a sound with beats to inspire the walker's spirit and vigor.

26 Claims, 6 Drawing Figures

ELECTRONIC MUSIC PACE-COUNTING SHOE

CROSS REFERENCES TO RELATED APPLICATIONS

The present application is a continuation-in-part of application Ser. No. 267,630 filed 6-27-81 now U.S. Pat. No. 4,402,147.

Reference is made to U.S. applications by the present inventor, Ser. No. 176,764, filed Aug. 11, 1980 now abandoned, entitled SHOE WITH AUTOMATIC COUNTER, and Ser. No. 267,630 filed May 27, 1981 now U.S. Pat. No. 4,402,147, entitled SHOE HAVING CIRCUITRY AND DISPLAY FOR AUTOMATICALLY DETERMINING NUMBER OF STEPS. The disclosure of such applications are incorporated herein by reference.

BACKGROUND OF THE INVENTION

The present invention relates to a device for determining the number of steps walked.

The present invention not only accumulates the number of steps walked, but also provides music to entertain the walker, and selectively sounds beats to inspire the walker's spirit and vigor.

SUMMARY OF THE INVENTION

The present invention provides an additional electronic circuit device in a shoe which, upon walking or jogging, applies the technique of utilizing a single chip microcomputer. An external walking sensor circuit generates square wave signals to an I/O circuit in the microcomputer chip. A software control program will count the square wave signals entered to get the pace number. Several microcomputer I/O circuits are used to drive a multisegment digital displayer (generally, it has 7 segments) and another several I/O circuits are used to execute a scan of each digit, so the pace number to be counted can be displayed.

In accordance with another aspect of the present invention the microcomputer chip contains a control program which can preset a count and automatically decrease the count by one in response to each pace. An audible alarm is sounded when the preset count is decreased to zero.

In accordance with another aspect of the present invention, the microcomputer chip contains control programs which are used to generate many different musical notation signals which are applied, through an amplifying circuit to a speaker, so that music can be generated simultaneously when walking to entertain the walker.

In accordance with another aspect of the present invention, software control programs are provided to generate many sounds with different beats (such as drumbeats) and to convert the musical notation signals into the beat sound signals when the walking speed reaches a certain degree. One or more than one multistage turning switches are used to select and determine the music or beat varieties required for walking.

In accordance with another aspect of the present invention a software control program is used to count the time interval from a walking input signal to the next walking input signal; and another control program utilizes the time interval counted as above mentioned to determine the tempo for the given music beat or beat sound. The tempo for the music beat or beat sound can thus be adjusted to the walking speed rate.

In accordance with still another aspect of the present invention, a radio transmitter is used to put the musical notation signals or beat sound signals into a carrier for modulation so as to transmit them in the air, then they will be received by a receiver which is disposed on the wearer or elsewhere.

A software control program is also provided to obtain the walking speed rate (pace number per hour or per minute) by applying the time interval counted from a walking input signal to the next input signal as above mentioned.

A keyboard is provided at the vamp or other adequate places which allow the wearer to operate and communicate with the CPU of the microcomputer chip.

BRIEF DESCRIPTION OF THE DRAWINGS

Embodiments of the invention are described in the following detailed description taken in connection with the accompanying drawing wherein.

DETAILED DESCRIPTION OF THE PREFERRED EXEMPLARY EMBODIMENT

Figure 1:
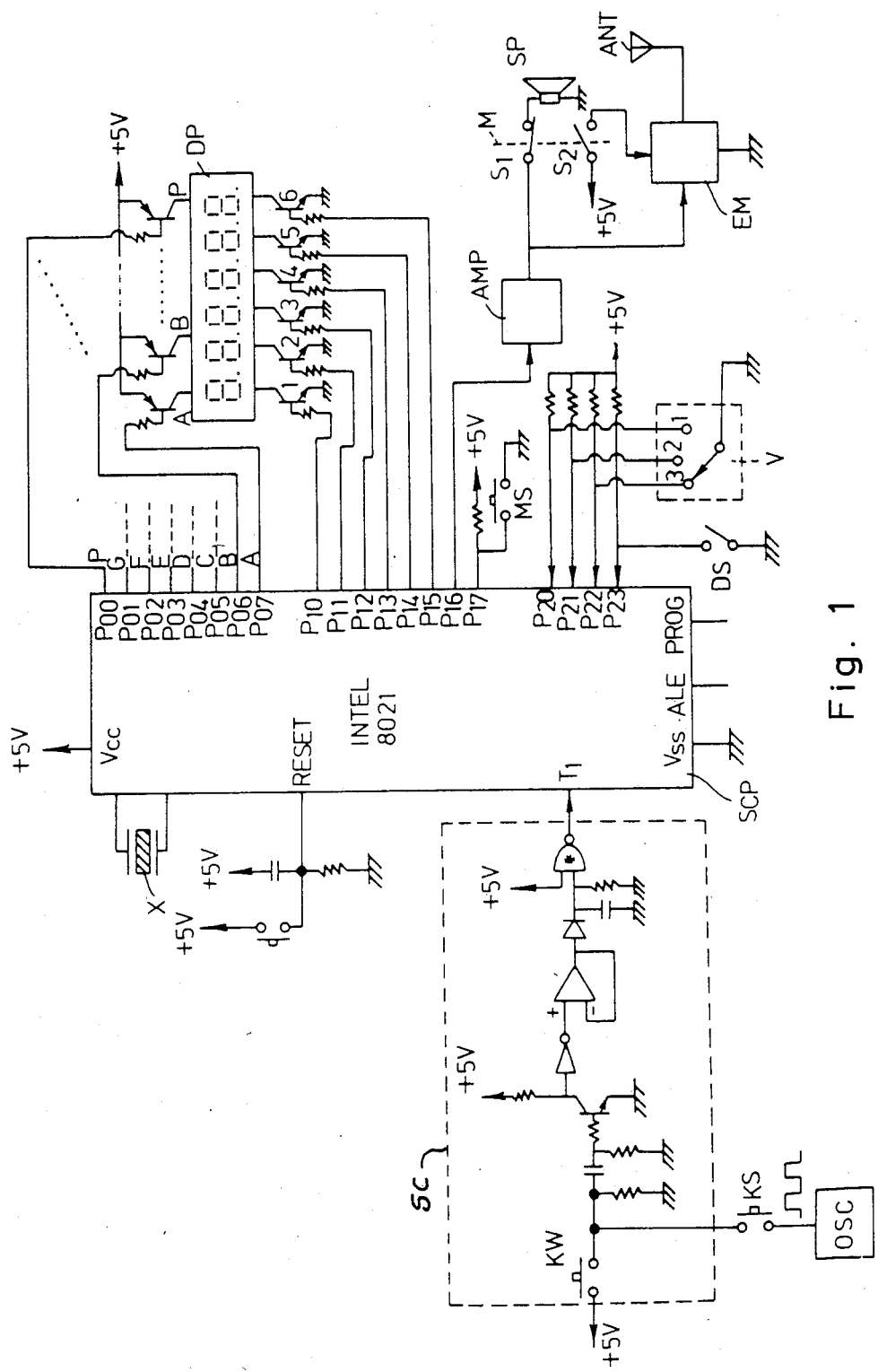
FIG. 1 is a schematic diagram of exemplary hardware in accordance with the present invention.

As shown in FIG. 1, a suitable microcomputer chip SCP, such as an INTEL 8021 cooperates with a suitable display DP, amplifier AMP, and sensor circuit SC, as will be explained.

Microcomputer SCP includes a 1 k location Read Only Memory (ROM), a 64 byte Random Access Memory (RAM) each byte denoted by $R_0, R_1, \ldots R_{63}$ respectively, an 8 bit timer, two 8-bit I/O ports $P_0$ ($P_{00}$–$P_{07}$) and $P_1$ ($P_{10}$–$P_{17}$), and a 4 bit I/O port $P_2$ ($P_{20}$–$P_{23}$) (20 I/O circuits in-total), and a test pin $T_1$ which can be used for input purposes.

The 1k ROM is divided into 4 pages, which can be accessed only within the same page upon a conditional command.

The 64 byte RAM has two eight-register bands.

Display DP includes 6 digits. The data for the 7 display numbers and the decimal point is provided by microcomputer outputs $P_{00}$–$P_{07}$, and the scanning data for the digit to be lighted is provided by microcomputer outputs $P_{10}$–$P_{15}$.

Microcomputer output $P_{16}$ provides output signals corresponding to the sound beats or music upon walking or alarm signal upon completing the preset pace number, and is coupled to amplifier AMP.

I/O ports $P_{20}$–$P_{22}$ are used as input circuits for selecting the music or beat varieties, and are coupled to a tri-stage selecting switch V.

A selecting switch DS is provided to control display of the data varieties required; when DS is closed, the displayed data is the pace number, or the walking speed rate. A storing switch MS is also provided to effect storage of the data displayed on DP in a pre-partitioned memory.

To preset a pace number count, a switch KS is pressed to apply square waves, generated by an oscillator OSC to Test input $T_1$ of Microcomputer SCP. At this time, display DP will display the number of square waves applied to $T_1$. When the digit shown on DP reaches the number desired, switch KS is released. Switch MS, is then depressed to enter the displayed number into the pre-partitioned memory.

Amplifier AMP is connected to a speaker SP, and a radio transmitter EM is coupled to an Antenna, ANT. A coupling switch M is provided to selectively feed the sound signals generated by amplifier AMP directly into speaker SP or to a radio transmitter. When the allocation is as shown in the figure (i.e. $S_1$ is On, $S_2$ is Off), the signals are fed in speaker SP and sounded directly. When, however, $S_1$ is Off and $S_2$ is On the signals are transmitted by radio transmitter EM.

Walking sensor SC (shown in dotted line) includes a sensing switch KW located in the sole of the shoe as will be explained. Switch KW will be momentarily depressed (on), one time each time a pace is made. Once switch KW is on, a positive going pulse is generated and applied through a shaping circuit to excite a transistor. The pulse is applied to a phase inverter which generates an instantaneous positive potential. An operational amplifier (OP AMP) will elevate the current potential power and make it pass through a filter circuit composed of capacitive reactances. As a result, the pulses are provided to $T_1$ through a SCHMITT trigger. Thus, the signals obtained by $T_1$ (High when there is no signal, and Low where there are signals) will be very stable.

Figure 2:
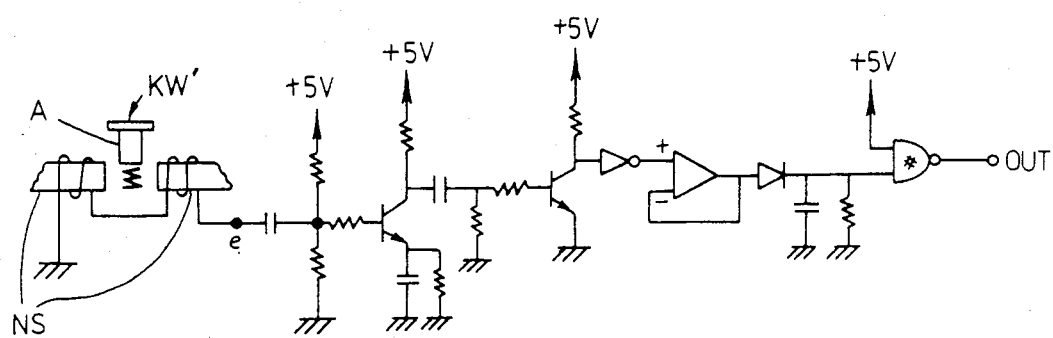
FIG. 2 is a schematic diagram of another example of the walking sensor of FIG. 1.

FIG. 2 shows another illustration of walking sensor SC of FIG. 1 using a switch KW' put in the sole. Comprising a magnet A, cooperating with a coil NS, wound about a magnetic permeable core. Each pace the walker makes will press KW' to drive the magnet A past a portion of coil causing NS a small voltage to be generated at point e. The small voltage is amplified and shaped, generates a Low signal at the output terminal for application to microcomputer input $T_1$. If desired, a photo-optical switch can be used for switch KW.

Figure 3:
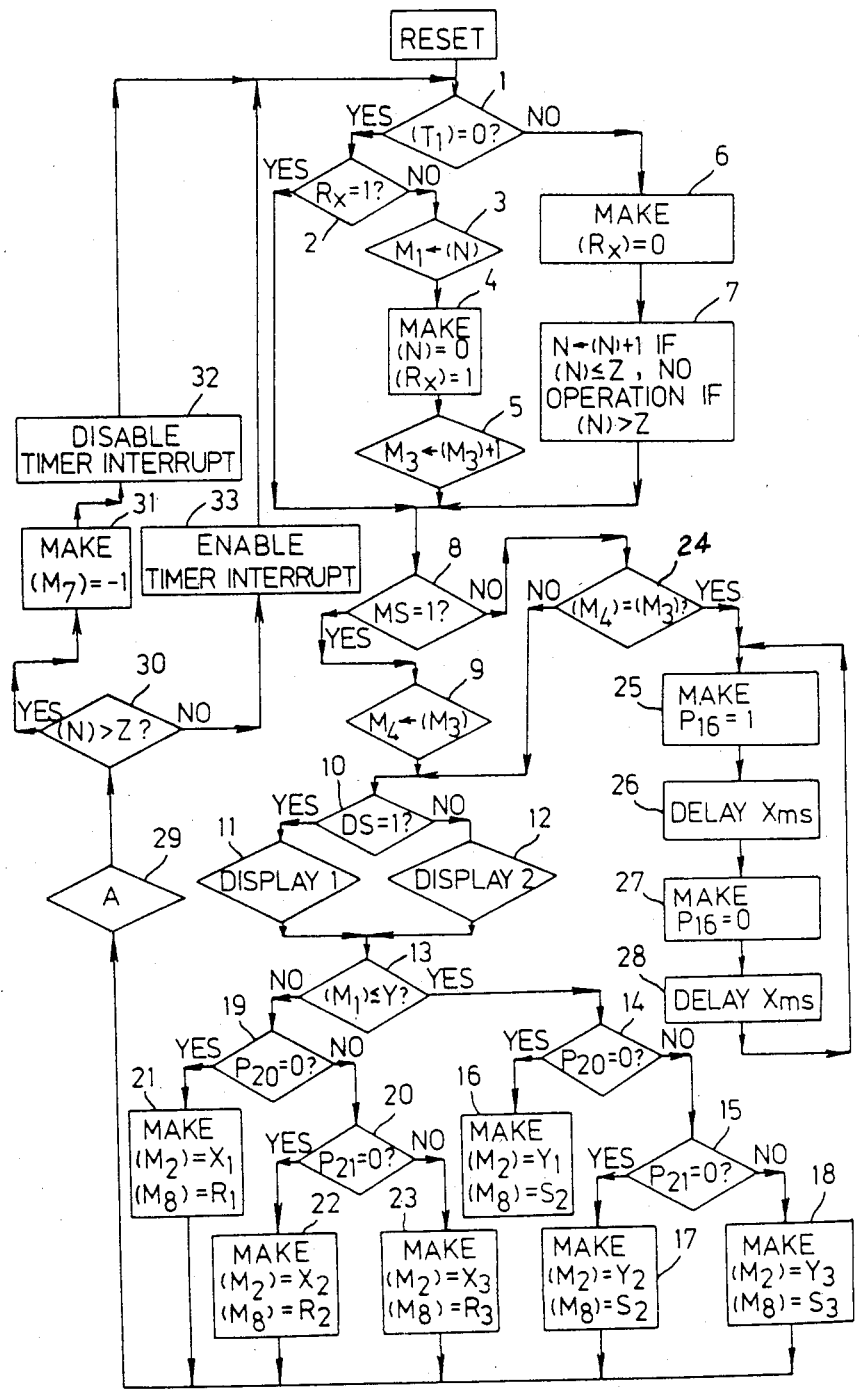
FIG. 3 is a block schematic diagram showing the main flowchart in accordance with the present invention.
Figure 4:
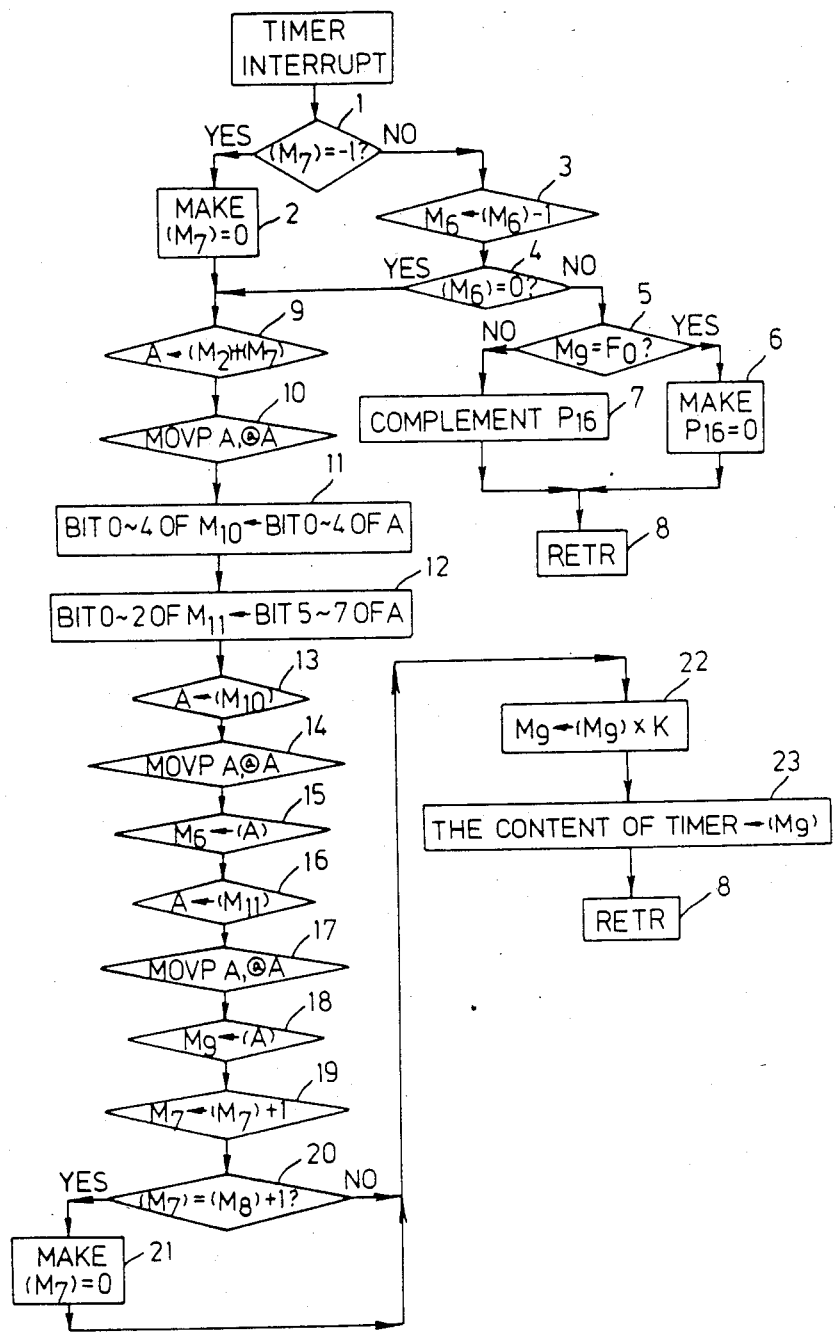
FIG. 4 is a block schematic diagram showing the sub-flowchart in accordance with the present invention.

Flowcharts of the software programs of the present invention, are shown in FIGS. 3 and 4, FIG. 3 shows the main flowchart and FIG. 4 is a flowchart of INTERRUPT SERVICE ROUTINE when the Timer causes interrupt. Firstly, some memories and various tables established in microcomputer SCP will be described as follows:

Memory N, composed of more than two registers, is used to record the time interval data between successive High signal outputs from the walking sensor SC.

Memory $M_1$, composed of more than two registers, stores the time interval data being accumulated in N when HIGH signals coming from the walking sensor go low; that is, it stores the time interval data indicative of the period that the square wave pulse (square wave in Low form) coming from the walking sensor ends and the next square wave pulse appears.

Memory $M_2$ is a register, which is used to store the starting address of a designated music table or a designated sound table.

Memory $M_3$, composed of more than two registers, is used to store the resultant count data after counting the number of square waves provided by the walking sensor.

Memory $M_4$, composed of more than two registers, is used to prestore the data representing a desired number of paces.

Memory $M_5$ is a register, which is used to store starting data about the time it starts its time-counting. The object of this function is that the time interval between the interrupt of the timer to its next interrupt can be freely controlled through $M_3$.

Memory $M_6$, composed of more than two registers, is musical score and meter memory and used to store the data about how many square waves shall be provided from output terminal $P_{16}$.

Memory $M_7$ is a register, which is used to store the address of the data of a designated musical or sound frequency after checking them in the music or sound tables.

Memory $M_8$ is a register, which is used to store the data number contained in a designated music or sound table after checking them.

The music or sound table, comprises a plurality of successive 8-bit bytes containing the data of musical score or sound frequency. Each word in the music table is organized as follows: BIT 0~2 designate musical notation (i.e. 1, 2, . . . 7 and rest), BIT 3, 4 designate scale (i.e. bass, alto, treble and etc.), BIT 5~7 designate meter (semiquaver, quaver, crotchet, minim, simple time, double time, triple time and quadruple time). Three music tables (tables of three different songs) and three sound tables (tables of three different beat sounds) are provided. A musical notation table (incl. bass, alto and treble) and a musical meter table are further needed, all of which are listed below:

The musicl notation table contains the frequency data for the respective music notations. An exemplary table is as follows (starting address is denoted by MT):

| | | | | | | | | | | |
|---|---|---|---|---|---|---|---|---|---|---|
| MT: | X X X 0 0 0 0 0 | (rest) | $\longrightarrow$ | $F_0$ |
| | X X X 0 0 0 0 1 | (1) | $\longrightarrow$ | $LF_1$ |
| | X X X 0 0 0 1 0 | (2) | $\longrightarrow$ | $LF_2$ |
| | X X X 0 0 0 1 1 | (3) | $\longrightarrow$ | $LF_3$ |
| | X X X 0 0 1 0 0 | (4) | $\longrightarrow$ | $LF_4$ |
| | X X X 0 0 1 0 1 | (5) | $\longrightarrow$ | $LF_5$ |
| | X X X 0 0 1 1 0 | (6) | $\longrightarrow$ | $LF_6$ |
| | X X X 0 0 1 1 1 | (7) | $\longrightarrow$ | $LF_7$ |
| | X X X 0 1 0 0 0 | (rest) | $\longrightarrow$ | $LF_0$ |
| | X X X 0 1 0 0 1 | (1) | $\longrightarrow$ | $F_1$ |
| | X X X 0 1 0 1 0 | (2) | $\longrightarrow$ | $F_2$ |
| | X X X 0 1 0 1 1 | (3) | $\longrightarrow$ | $F_3$ |
| | X X X 0 1 1 0 0 | (4) | $\longrightarrow$ | $F_4$ |
| | X X X 0 1 1 1 0 | (5) | $\longrightarrow$ | $F_5$ |
| | X X X 0 1 1 1 0 | (6) | $\longrightarrow$ | $F_6$ |
| | X X X 0 1 1 1 1 | (7) | $\longrightarrow$ | $F_7$ |
| | X X X 1 0 0 0 0 | (rest) | $\longrightarrow$ | $F_0$ |
| | X X X 1 0 0 0 1 | (1) | $\longrightarrow$ | $HF_1$ |

-continued

| | | | | | | | | |
|---|---|---|---|---|---|---|---|---|
| X | X | X | 1 | 0 | 0 | 1 | 0 | (2) | → HF$_2$
| X | X | X | 1 | 0 | 0 | 1 | 1 | (3) | → HF$_3$
| X | X | X | 1 | 0 | 1 | 0 | 0 | (4) | → HF$_4$
| X | X | X | 1 | 0 | 1 | 0 | 1 | (5) | → HF$_5$
| X | X | X | 1 | 0 | 1 | 1 | 0 | (6) | → HF$_6$
| X | X | X | 1 | 0 | 1 | 1 | 1 | (7) | → HF$_7$

Scale Notation

The data as above listed is the frequency data of musical notation (LFi is Low frequency, Fi is medium frequency and HFi is High frequency), this data will be loaded into the timer to determine how much time is needed for each interrupt the timer causes, and then, the frequency of sound wave coming from P$_{16}$ can be selected and determined to form a desired musical notation.

An exemplary musical meter table, (starting address is denoted by NT) is as follows:

| NT | X X X X X 0 0 0 (1/16 beat) | → P$_0$ |
| | X X X X X 0 0 1 (⅛ beat) | → P$_1$ |
| | X X X X X 0 1 0 (¼ beat) | → P$_2$ |
| | X X X X X 0 1 1 (½ beat) | → P$_3$ |
| | X X X X X 1 0 0 (1 beat) | → P$_4$ |
| | X X X X X 1 0 1 (2 beat) | → P$_5$ |
| | X X X X X 1 1 0 (3 beat) | → P$_6$ |
| | X X X X X 1 1 1 (4 beat) | → P$_7$ |

The data as above checked is the musical square wave number coming from P$_{16}$, as this number certainly exceeds 255, it must be stored with two bytes.

A memory M$_9$ is utilized to store the frequency data obtained immediately after checking the musical notation table and use Memory M$_6$ to store the data about the number of square waves which is obtained immediately after checking the musical meter table (as above mentioned, M$_6$ is composed of more than two registers).

A register M$_{10}$ is utilized for registering the address data of musical notation table (incl. the portion of musical scale).

A register Rx acts as a mark (FLAG) to record whether walking signals from the sensor have been read-in, (1 for Yes, 0 for No).

Referring now to FIG. 3, the main routine will be described.

At program block 1 the signals provided by the walking sensor are read, if there exist signals, enter into block 2, otherwise enter into 6.

At program block 2 it is determined whether the signals of the walking sensor to be read have been processed. At block 3 the data of memory N is loaded into M$_1$ (as above mentioned, N is a memory which contains a count indicative of the time interval that the walking sensor has no signal); at block 4, after loading memory M$_1$, register N is cleared to 0 and Rx is set at 1 to avoid repeated processing of same signals coming from the walking sensor. As indicated at block 5, the number of LOW square waves provided by the walking sensor are then counted.

As shown at Blocks 6 and 7 during the period the walking sensor has no signal, (T$_1$=1) Rx is cleared to 0 so that processing the signals possibly generated next time can be effected. Furher, the time interval during this period is counted. However, when the content of N is counted to more than a certain value Z (that is, when the wearer takes off the shoes or the walker stops walking), they will not count any more.

As shown at blocks 8 and 9, if switch MS (store display) is on, content of M$_3$ is loaded into M$_4$. If switch MS is not on, as shown at blocks 24~28, the pace number is compared to the preset pace number (M$_4$). If the pace number is equal to the preset number a reminding call (alarm) signal will be generated from P$_{16}$. If the pace and preset number are not equal, (or MS is on), as shown at blocks 10~12, the state of selecting switch DS is tested. When the switch DS is on, the display device will display the pace number walked; and if it is off, display the pace number per unit time.

As shown at block 13 the count indicative of the time interval during the period the walking sensor has no signal, is compared to a preset standard value Y: if more than Y (that is, the walking speed rate is less than a certain value), the location of multistage turning switch V (FIG. 1) is checked and the required music table or beat sound table is selected in accordance with blocks 19~23; if less than or equivalent to Y, in accordance with blocks 14~18.

X$_1$, X$_2$ and X$_3$ each denotes a starting address of three different music tables, and R$_1$, R$_2$ and R$_3$ each denotes a data number contained in these three tables. Y$_1$, Y$_2$ and Y$_3$ each denotes a starting address of three different beat sound tables, and S$_1$, S$_2$ and S$_3$ each denotes a data number contained in these three tables. When the walking rate is less than a certain value, subject to the location of multistage turning switch, switch, the starting address of a certain music table is loaded into M$_2$ and its contained data number is loaded into M$_8$ (as shown in blocks 21~23). However, when the walking rate is more than a certain value, the starting address of a designated beat sound table and its contained data number will be stored (as shown in blocks 16~18).

After the appropriate data has been loaded into M$_2$ and M$_8$, as represented at block 29, the content of N is used to obtain a K value, (this K value is the factor determining the tempo of music or beat sound) and the content of N is used to obtain the walking speed rate per unit time of all kinds. Thereafter, as shown at blocks 30~32, if use of the shoes stop, the timer interrupt is descried to eliminate the music or beat sound. Further, as shown in block 31 when the content of N is more than Z because the shoes are not yet in use, the timer will cause the first interrupt and re-operate from the starting point in accordance with the mark "(M$_7$)=1". However, in block 33, the timer causes an interrupt and the music or beat sound is performed when the content of N is less than Z (that is, walking has begun).

As shown in FIG. 4, referring to "TIMER INTERRUPT SERVICE ROUTINE", the incurrence of interrupt is applied to alternately make P$_{16}$ become 1 or 0. Also, the time and the number of times set for causing interrupt is applied to control the output frequency P$_{16}$ and to provide a music effect. As shown in block 1 it is first determined whether to work from the starting point, ((M$_7$)=−1) and, if so, to initialize (block 2) set (M$_7$)=0 (i.e. the starting point). If the content of M$_7$ is not initialized, the pulse count in M$_6$ is decremented, and checked for completion (blocks 3 and 4). If the pulse count in M$_6$ has not been completed, (or after M$_7$ is initialized), as shown in block 9, the starting address of a designated music table and the content (that is the address of a certain notation data in the music table) of ($M_7$) are summed and the aggregate loaded into A (Accumulator). As shown in block 10 the content of the address memory designated in A and stored is then loaded into A. Therefore, the data in A will be a designated notation data at this time. The respective fields of musical notation data (incl. scale portion) and musical meter portion, are separated, and temporarily stored into $M_{10}$ and $M_{11}$, respectively.

As shown in blocks 13~18 the musical notation table and musical meter table are then checked and the checked result loaded into $M_6$ and $M_9$ respectively.

As shown in block 19 content of $M_7$ is then incremented, so that the next location in the music table or beat sound table can be obtained when making a sequential table check. As shown in block 20, the content of $M_7$ is then checked against the data number contained in table $M_8$, if more than the data number, re-clear ($M_7$) to become 0. Thus, the music or beat sound signals can be repeatedly and circulatively generated.

As indicated in block 22, the content of $M_9$ is multiplied by the value K (block 29 as shown in FIG. 3) to adjust the time interval of the interrupts. Thus, the walking speed can control the tempo of music or beat sound.

As indicated at block 23 the content of $M_9$ is then moved into the timer.

The number of square waves generated by $P_{16}$ is again decremented and checked for completion. If the count has been completed, it is determined whether the musical notation is a rest. If it is, make $P_{16}=0$ (as block 6 shows), if not, alternately make $P_{16}=0$ or 1 (as block 7 shows).

The work content of block 8 is: when service is over, the program is reset to the address of main program.

Figure 5:
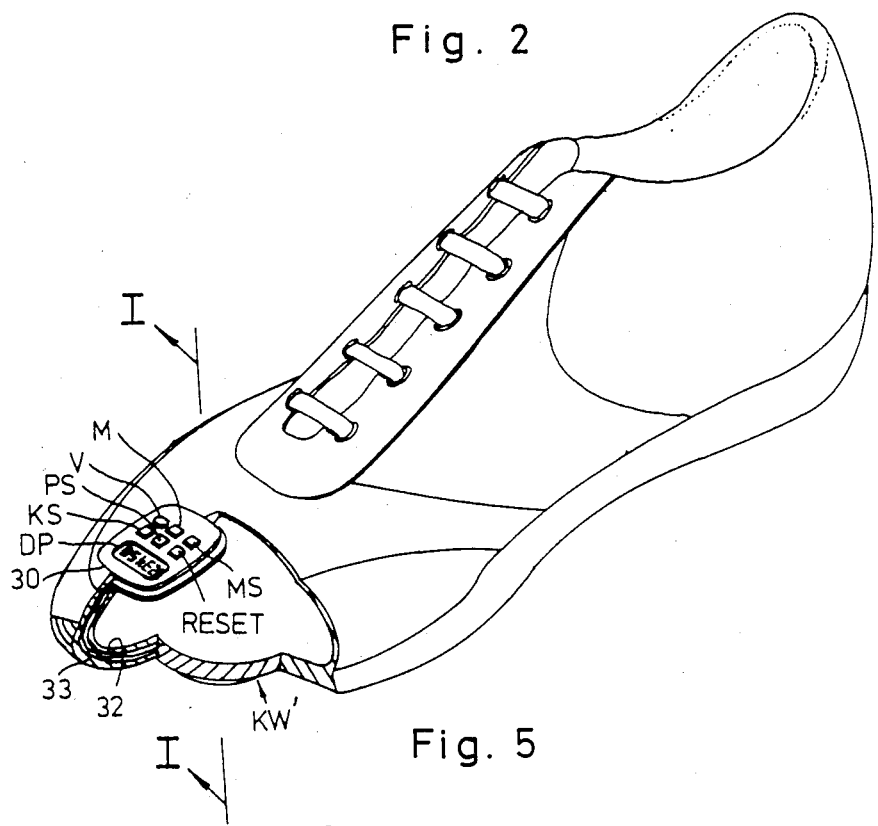
FIG. 5 is a perspective view of a shoe which illustrates the location of the circuitry, display and switch in accordance with the present invention.
Figure 6:
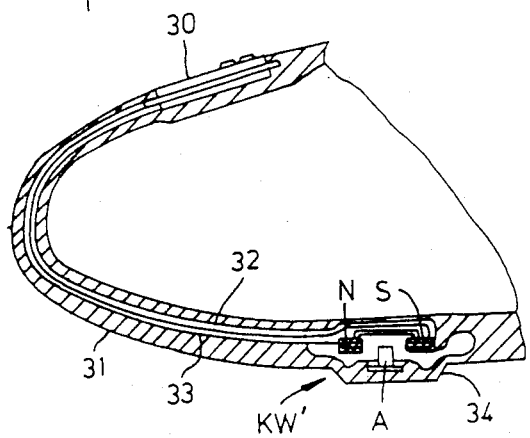
FIG. 6 is a cross sectional view taken along lines I—I of FIG. 5 to reveal the location of the circuitry, display and switch suitable in practicing the invention.

FIG. 5 and FIG. 6 show, the disposition of the present invention in a shoe. As shown in FIG. 5, the entire device can be put in a main body (30) and switch KW (KW') (KW' is taken in this illustration) is put in the sole (31), KW' connects with the main body 30 through two guided conductor lines (32), (33). A trigger key 34 is provided, protruding downward from sole 31. The structure and elasticity of key 34 are similar to a computer key, and accordingly no further description made herein.

What is claimed is:

1. Apparatus adapted for disposition on a shoe, comprising:
   a switch device for generating a pace signal in response to each pace taken by said shoe; and
   an electronic device responsive to said pace signals for generating pace count indicative of paces taken with said shoe, said electronic device comprising:
   means for storing indicia of a predetermined number of paces;
   means for comparing said pace count to said stored number of paces, and generating alarm signals when a predetermined relationship exists between said pace count and said stored number of paces, said alarms signals including musical notes having a tempo corresponding to a tempo of paces taken by said shoe; and
   a display device for providing indicia of said count.

2. The apparatus of claim 1 wherein said electronic device further comprises:
   means responsive to said pace signals, for generating an interval count indicative of the time interval between successive pace signals;
   means responsive to said interval count, for generating a rate signal indicative of the repetition rate of said paces; and
   means for selectively applying said pace count and said rate signal to said display device for display.

3. The apparatus of claim 1 or 2 wherein said alarm signals comprise a representation of music.

4. The apparatus of claim 3 wherein said electronic device further includes radio transmitter means for transmitting said alarm signals.

5. The apparatus of claim 1 or 2 wherein said alarm signals comprise a representation of a beat sound.

6. The apparatus of claim 5 wherein said electronic device further includes radio transmitter means for transmitting said alarm signals.

7. The apparatus of claim 2 further including data entry means, disposed on said shoe, for selectively providing data input signals to said electronic device.

8. The apparatus of claim 1 wherein said electronic device further includes radio transmitter means for transmitting said alarm signals.

9. The apparatus of claim 1 further including data entry means, disposed on said shoe, for selectively providing data input signals to said electronic device.

10. The apparatus of claim 9 wherein said data entry means includes a keyboard.

11. The apparatus of claim 1, 2, 9 or 10 wherein said electronic device comprises:
    a microprocessor, including a first input port for receiving said pace signals; a first group of output ports, for communicating data to said display device; a second group of output ports for generating control signals to said display device, to effect scanning operation of said display device; a second group of input ports, receptive of data input signals; and a third output port for generating said alarm signals.

12. The apparatus of claim 11 wherein said alarm signals comprise a representation of music.

13. The apparatus of claim 11 wherein said alarm signals comprise a representation of a beat sound.

14. The apparatus of claim 11 wherein said electronic device further includes radio transmitter means for transmitting said alarm signals.

15. The apparatus of claim 1, 2, 9 or 10, wherein said apparatus is constructed as an integral part of said shoe.

16. The apparatus of claim 1 wherein said means for storing comprises;
    an accessible memory; and
    data input means for selectively generating signals indicative of said predetermined number of paces to establish a reference count in said memory.

17. Apparatus adapted for disposition on a shoe, comprising:
    means for generating a pace signal in response to each pace taken with said shoe;
    an electrical device responsive to said pace signals, said electronic device including:
    first memory means comprising at least one group of addressable locations for storing indicia of various sounds;
    output means, selectively receiving said indicia of various sounds, for controllably generating audible representations of said sounds; and designating means, responsive to said pace signals, for selectively designating respective locations of said first memory means in predetermined sequence and sequentially applying signals indicative of the contents of each said designated location to said output means.

18. The apparatus of claim 17 further comprising:
second memory means for storing indicia of the number of paces taken;
third memory means, responsive to data input signals applied thereto, for storing indicia of a predetermined count;
means for comparing said number of paces taken and said predetermined count, and generating a comparison signal in accordance with said comparison; and
alarm means, responsive to said comparison signal, for selectively generating indicia of alarm.

19. The apparatus of claim 18 wherein said alarm means comprises means for selectively actuating said designating means.

20. The apparatus of claim 17 further comprising:
display means, responsive to output data signals applied thereto, for generating visual indicia of said output data; and
means for selectively applying signals from said second memory means representative of said number of paces, as output data signals to said display means.

21. The apparatus of claim 20 further comprising:
fourth memory means for storing an interval count indicative of the time interval between successive pace signals;
means, responsive to said interval count, for generating rate signals indicative of the repetition rate of said paces; and
means, for selectively applying said rate signals as output data signals to said display means.

22. The apparatus of claim 17 wherein said designating means includes;

fifth memory means responsive to selection data signals applied thereto for storing indicia of the starting address of a designated portion of said second memory means;
means, for storing indicia of an instantaneous address, corresponding to said starting address incremented in response to each said pace signal; and
means for applying signals to said output means in accordance with the content of the location in said first memory means corresponding to said instantaneous address.

23. The apparatus of claim 22 further including data entry means for selectively generating said selection data signals to designate different portions of said fifth memory means.

24. The apparatus of claim 17 wherein said first memory means comprises:
a music notation table, comprising a plurality of addressable memory location, each corresponding to a respective predetermined frequency;
a meter table, comprising a plurality of addressable memory locations, each corresponding to a respective musical beat; and
a score table, including at least one group of addressable memory locations, each location in said group corresponding to a portion of a musical score and containing indicia of a location in said music notation table and a location in said meter table.

25. The apparatus of claim 17, 18, 19, 20, 22, 23 or 24 wherein said apparatus is constructed as an integral part of said shoe.

26. The apparatus of claim 17 or 18 further comprising:
fourth memory means for storing an internal count indicative of the time interval between successive pace signals;
means, responsive to said interval count, for generating rate signals indicative of the repetition rate of said paces; and
means, for selectively applying said rate signals as output data signals.

* * * * *